United States Patent [19]

Williams et al.

[11] 3,901,097

[45] Aug. 26, 1975

[54] CONTROL MECHANISM

[75] Inventors: Richard D. Williams, Fairport; Fred G. Michaels, Pittsford, both of N.Y.

[73] Assignee: General Motors Corporation, Detroit, Mich.

[22] Filed: Mar. 25, 1974

[21] Appl. No.: 454,244

[52] U.S. Cl. ................. 74/475; 70/248; 74/473 R; 74/504; 74/540; 116/DIG. 20; B60r/25/06
[51] Int. Cl. ................. G05g 5/10; E05b 65/12
[58] Field of Search.......... 74/540, 473 R, 475, 504, 74/878, 850; 70/248; 116/DIG. 20

[56] References Cited
UNITED STATES PATENTS

| | | | |
|---|---|---|---|
| 3,703,092 | 11/1972 | Elliott | 70/248 |
| 3,765,262 | 10/1973 | Mendenhall | 70/248 X |
| 3,844,180 | 10/1974 | Williams et al. | 74/473 R |

*Primary Examiner*—Allan D. Herrmann
*Attorney, Agent, or Firm*—John P. Moran

[57] ABSTRACT

A vehicular instrument panel-mounted control mechanism including rotary control knob and associated actuator and lock mechanism assemblies cooperating to provide a mechanical arrangement for start-up in NEUTRAL or PARK only, key removal in PARK only, system lock-up in PARK, locked steering in PARK, and automatic return to NEUTRAL from any drive range prior to engaging the START circuit.

7 Claims, 10 Drawing Figures

CONTROL MECHANISM

This invention relates generally to control mechanisms and, more particularly, to instrument panel-mounted transmission shift control mechanisms.

An object of the invention is to provide an improved automotive instrument panel-mounted control mechanism suitable for performing a variety of functions.

Another object of the invention is to provide an improved instrument panel-mounted shift control mechanism having a rotary control knob and associated actuator assembly for actuating selected transmission drive ratios, and a lock mechanism cooperating therewith to provide a mechanical arrangement for Start-up in NEUTRAL or PARK only, key removal in PARK only, lockup in PARK, locked steering in PARK, and automatic return to NEUTRAL from any drive range prior to engaging the START circuit.

A further object of the invention is to provide an improved control mechanism including a rotary control knob-type transmission control arrangement for rotating a sprocket and chain and associated cooperating cam plate and latch plate assembly to selectively produce six transmission drive ratios, namely: PARK [P], REVERSE [R], NEUTRAL [N], DRIVE [D], and two LOWS [S and L], via an interconnecting cable.

Still another object of the invention is to provide an improved vehicular instrument panel-mounted rotary control knob assembly and associated shift indicator pointer mechanism, with gear means associated therewith for causing the pointer element to move through an arc whose length is equal to one-half that of the rotary movement of the control knob, thus accommodating a more compact indicia layout on the instrument panel.

Still another object of the invention is to provide an improved instrument panel-mounted control mechanism wherein a rotary control knob serves to rotate a drive sprocket and an associated chain and larger driven sprocket, to thereby rotate a cam plate mounted for rotation with the driven sprocket, with a latch plate having a predetermined "lost motion" relationship with the cam plate for unlatching the latch plate prior to rotational movement to a different selected drive ratio position, there being a transmission-actuating cable connected to the latch plate.

A still further object of the invention is to provide such a rotary control knob and chain drive mechanism having associated therewith lock mechanism including a gear rotatable by an ignition key for reciprocally moving a pair of gear-racks having rod members associated therewith which, when the key is turned to START, LOCK, or ACCESSORIES, cooperate with openings formed in the driven sprocket and the cam plate during NEUTRAL and PARK conditions for selectively locking the steering wheel and/or preventing shifting to a "Forward" or a "Reverse" drive ratio.

A still further object of the invention is to provide the above-described control mechanism with a latch member operative with the latch plate, and a bellcrank member operable with the gear-rack arrangement, wherein the bellcrank member responds to movement of the gear-racks to START position to cause the latch member to initially unlatch the latch plate for subsequent rotation thereof by the manual actuation of the control knob.

Yet another object of the invention is to provide a gear drive arrangement which may be used in lieu of the sprocket and chain drive portion of the invention.

These and other objects and advantages of the invention will be apparent when reference is made to the following description and accompanying drawings, wherein:

Figure 1:
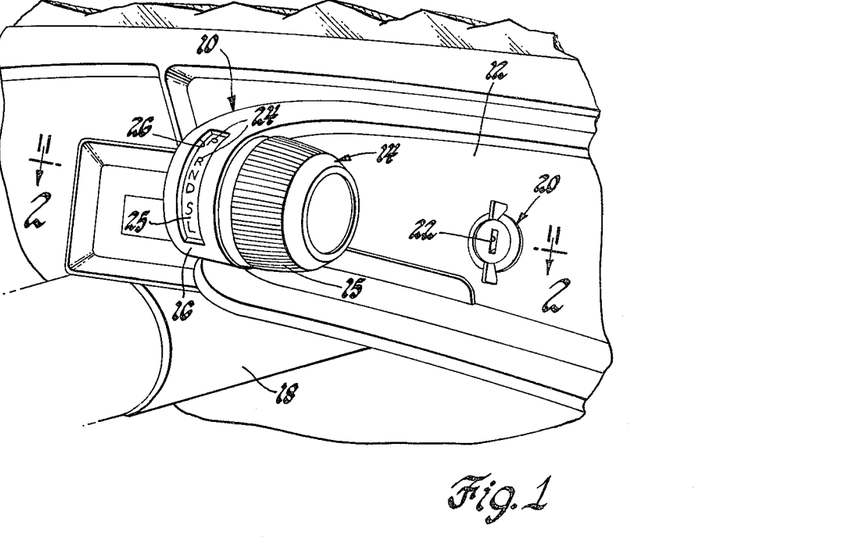
FIG. 1 is a perspective view of a vehicular instrument panel illustrating the inventive control mechanism mounted thereon.

Referring now to the drawings in greater detail, FIG. 1 illustrates a control mechanism 10 mounted on an instrument panel 12 of an automotive vehicle. The control mechanism 10 includes a control knob assembly 14 including an exterior control knob 15 rotatably mounted on a contoured rearwardly extending portion 16 of the instrument panel 12, in the vicinity of the steering column 18. A lock mechanism 20, including a key slot 22, is mounted on the instrument panel 12, in the vicinity of the control knob 15 and having its axis substantially at right angles with respect to the axis of the control knob 15. A plurality of drive ratio indicia 24 are formed on an arcuate-shaped plastic wall 15 (FIGS. 2 and 3) and observable through a window 26 formed in the contoured portion 16.

Figure 2:
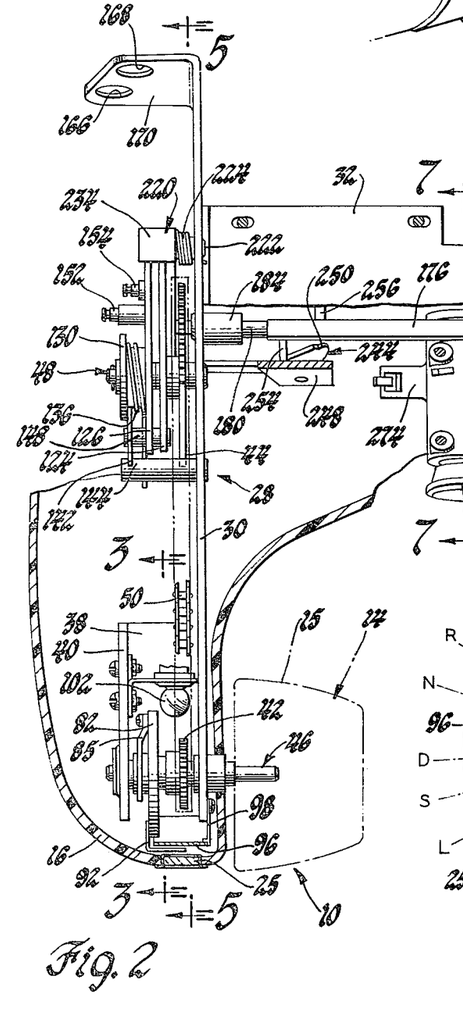
FIG. 2 is a fragmentary cross-sectional view taken along the plane of line 2—2 of FIG. 1, and looking in the direction of the arrows.
Figures 4, 6, 8:
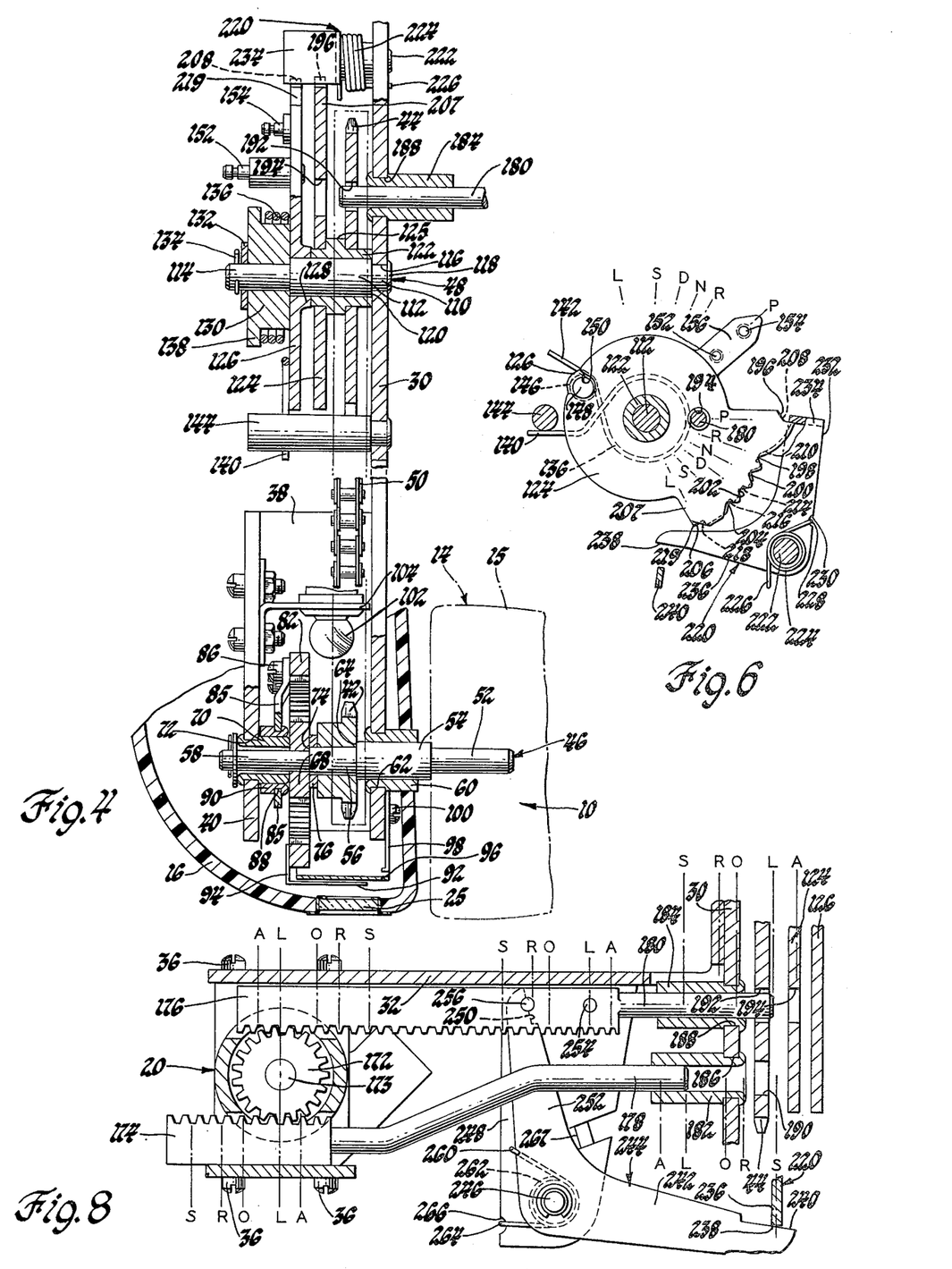
FIG. 4 is an enlarged fragmentary view of portions of FIG. 2.
FIG. 6 is an enlarged fragmentary cross-sectional view of particular components of FIG. 2.
FIG. 8 is a cross-sectional view taken along the plane of line 8—8 of FIG. 7, and looking in the direction of the arrows.
Figures 7, 9:
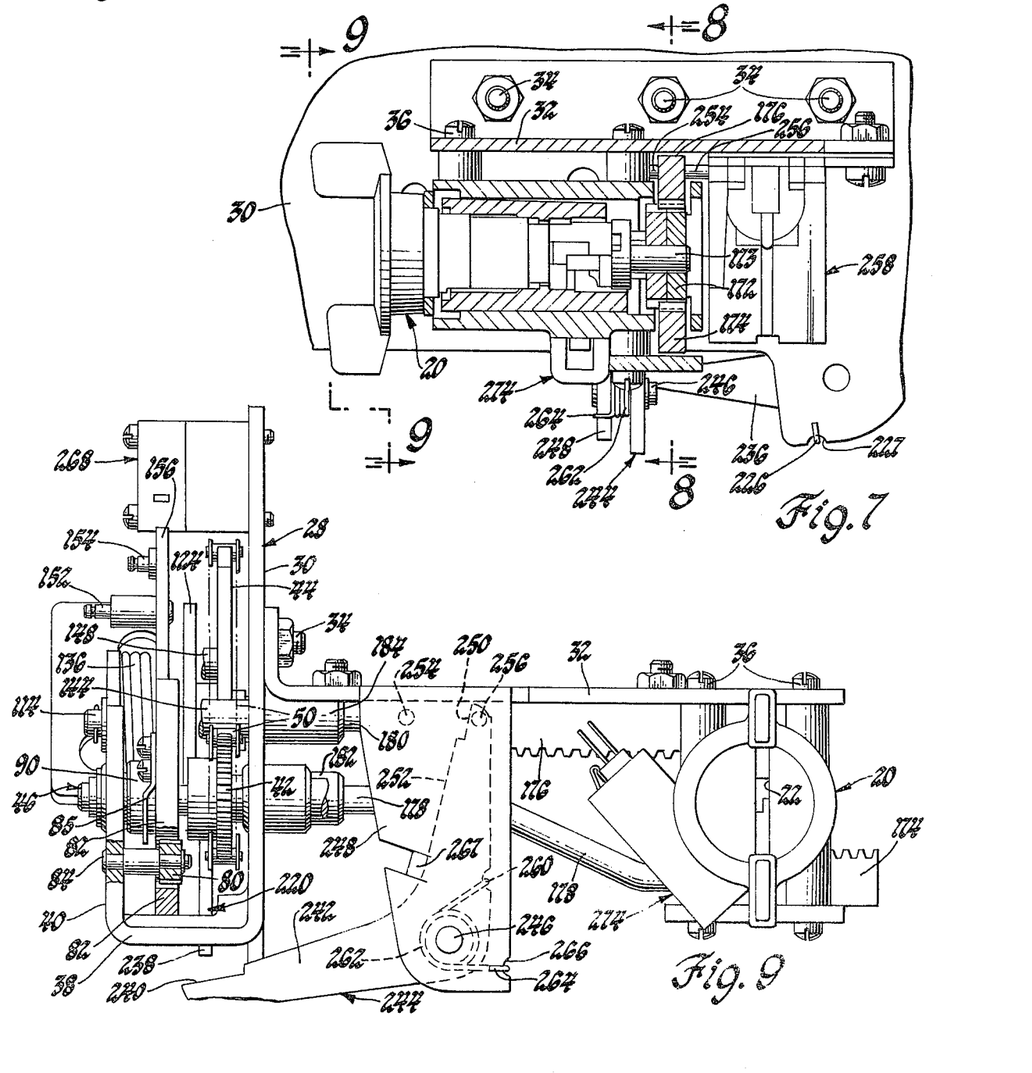
FIG. 7 is a cross-sectional view taken along the plane of line 7—7 of FIG. 2, and looking in the direction of the arrows.
FIG. 9 is a cross-sectional view taken along the plane of line 9—9 of FIG. 7, and looking in the direction of the arrows.

As may be noted in FIGS. 2 and 9, the control knob assembly 14 and the lock mechanism 20 are rigidly secured with respect to one another by an interconnected bracket assembly 28. The assembly 28 includes a first flat plate member 30 (FIG. 2) whose plane is positioned perpendicular to the axis of the control knob 15. The plate member 30 extends forwardly, i.e., toward the front of the vehicle, from within the contoured portion 16 of the instrument panel 12. A second flat plate member 32 (FIG. 9) is secured by bolts 34 to an intermediate portion of the first flat plate member 30, extending perpendicularly from the plane of the latter and serving as an overhead base for the mounting of the lock mechanism 20 thereon by means of bolts 36. As shown in FIGS. 4 and 9, a bottom plate member 38 extends laterally from a portion of the plate member 30, while a plate member 40 is formed on the end of the plate member 38, parallel with the plate member 30.

Figure 5:
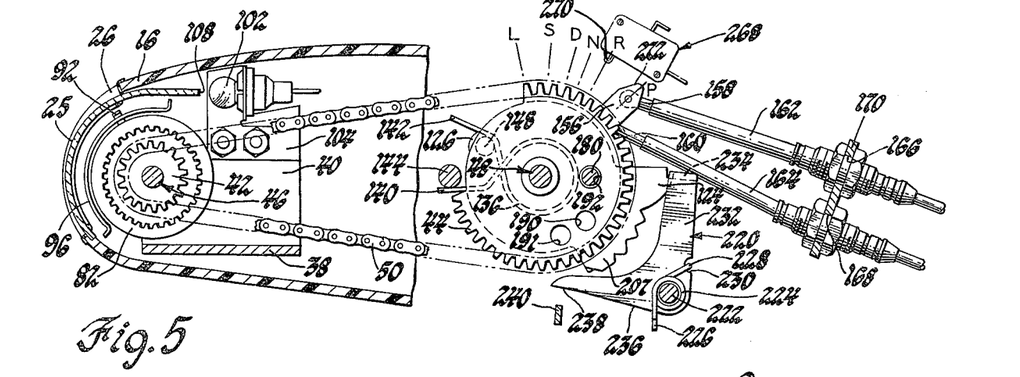
FIG. 5 is a cross-sectional view taken along the plane of line 5—5 of FIG. 2, and looking in the direction of the arrows.

As may be noted from FIGS. 2, 4, and 5, a pair of sprockets 42 and 44 are rotatably mounted on respective shafts 46 and 48 extending through the plate member 30, and are operatively interconnected by an endless chain 50. The shaft 46 is formed of a plurality of different diameter-portions 52, 54, 56, and 58; the diameter-portion 52 thereof extending from the control knob assembly 14 and adapted for rotation with the control knob 15; the largest diameter-portion 54 thereof being supported by a bushing 60 through an opening 62 formed in the plate member 30; while the sprocket 42 is press-fitted or otherwise secured around the diameter-portion 56 thereof and abutted against the shoulder 64 formed by the adjacent largest diameter-portion 54.

Figure 3:
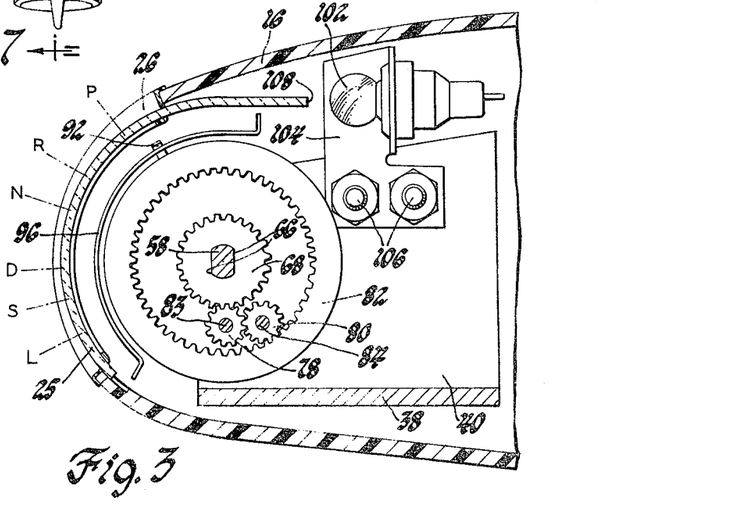
FIG. 3 is an enlarged fragmentary view taken along the plane of line 3—3 of FIG. 2, and looking in the direction of the arrows.

As shown in FIG. 3, the diameter-portion 58 is formed to include parallel flat sides 66 to drive a sun gear 68 mounted thereon at the same rotational speed as the sprocket 42. The sun gear 68 is axially confined between a bushing 70 mounted in an opening 72 formed in the plate members 40 and the shoulder 74 formed by the adjacent larger diameter shaft-portion 56. A spacer member 76 may be mounted on the shaft-portion 56 between the sun gear 68 and the sprocket 42. A pair of pinion gears 78 and 80 (FIG. 3) mesh respectively with the sun gear 68 and a ring gear 82. The pinion gears 78 and 80 are rotatably mounted on pins 83 and 84 (FIG. 9) secured to the plate member 40. The axial position of the ring gear 82 is maintained by means of a pair of oppositely disposed spokes 85 (FIG. 4) whose outer ends are secured to the ring gear 82 by screws 86, and whose inner ends are mounted in an annular groove 88 formed around a support ring 90, the support ring 90 being rotatably mounted around the bushing 70 and positioned axially between the sun gear 68 and the plate member 40.

A pointer 92 (FIG. 4) is secured by a leg-portion 94 thereof to the side of the ring gear 82. The pointer 92 thus extends laterally, intermediate an arcuate-shaped background plate 96 and the arcuate-shaped plastic wall 25 on which the drive ratio indicia 24 are formed. The background plate 96 is supported by a bracket or strap 98 secured by screws 100 to the plate member 30.

It should be noted at this point that the arrangement of gears 68, 78, 80, and 82 produces a rotary movement of the pointer 92 equal in length to a predetermined ratio, say, one-half, with respect to the length of movement of the control knob 15, hence, accommodating a more compact indicia 24 layout on the instrument panel 12.

As shown in FIG. 3, a light source 102 is mounted on a bracket 104 secured to the plate member 40 by bolts 106, with its light rays projecting toward an adjacent edge 108 of the arcuate-shaped plastic wall 25 and thence through the entire arcuate length thereof, thus causing the entire plastic wall 25, and hence the indicia 24, to become illuminated upon energization of the light source 102.

Referring now to FIG. 4, it may be noted that the shaft 48 of the larger sprocket 44 is formed of a plurality of different diameter-portions 110, 112, and 114, the diameter-portion 110 being mounted in an opening 116 formed in the plate member 30, and retained in this location by a head 118 formed thereon adjacent one side of the plate member 30 and by the shoulder 120 formed by the largest diameter shaft-portion 112 adjacent the other side of the plate member 30.

The larger sprocket 44 is secured to a hub member 122 mounted around the shaft-portion 112. A cam plate 124 is also secured to the hub member 122, spaced apart from the sprocket 44 by a flange 125 formed on the hub member 122. A latch plate 126 is mounted around the shaft-portion 112, with a hub 128 thereof abutting against the end face of the hub member 122, adjacent the cam plate 124. The latch plate 126 is retained in this position by a spacer member 130 mounted around the shaft-portion 114 and retained thereon by a washer 132 and a cotter pin 134 operatively connected to the end of the shaft-portion 114.

A coil spring 136 (FIG. 4) is mounted around the spacer member 130 intermediate the latch plate 126 and a flange 138 formed on the outer end of the spacer member 130. As illustrated in FIG. 6, extended ends 140 and 142 are formed on the respective end-portions of the coil spring 136. The extended end 140 is shown in FIG. 6 abutting against a fixed pin 144 secured to the plate member 30 radially outwardly of the sprocket 44, the cam plate 124 and the latch plate 126. The extended end 142 is shown abutting against a pin 146 secured to the latch plate 126. An extension 148 of the pin 146 extends into a slotted opening 150 formed in the cam plate 124. The diameter of the pin extension 148 is a predetermined amount smaller than the width of the slotted opening 150, providing a "lost-motion" relationship between the cam plate 124 and the latch plate 126. As may be noted in FIG. 6, the extended ends 140 and 142 of the spring 136 are positioned adjacent the respective outer sides of the pins 144 and 146 such that the pins are urged toward each other.

A pair of mounting pins 152 and 154 (FIG. 4) are secured at radially spaced predetermined locations (FIG. 6) to a leg-like member 156 formed on the latch plate 126. Cables 158 and 160 (FIG. 5) are secured to the mounting pins 152 and 154, respectively, and extend therefrom through respective sheathes 162 and 164 mounted in openings 166 and 168 (FIG. 2) formed in a flange 170 on the plate member 30 to the transmission (not shown) and the steering column 18, respectively.

Referring now to FIGS. 7 and 8, it may be noted that a gear 172 is secured to a shaft 173 extending from the inner end of the lock mechanism 20. The gear 172 meshes with a pair of parallel gear-racks 174 and 176. Rod members 178 and 180 are formed on the same ends of the gear-racks 174 and 176, respectively, and extend through respective bushings 182 and 184 mounted in openings 186 and 188 formed in the plate member 30. When extended beyond the bushing 182, the rod member 178 is selectively caused to enter either a PARK opening 190 or a NEUTRAL opening 191 (FIG. 5) formed in the sprocket 44. The rod member 180, once it extends beyond the bushing 184, is selectively caused to enter one or both aligned interlock openings 192 and 194 formed in the sprocket 44 and cam plate 124, respectively.

As noted in FIG. 6, a plurality of substantially V-shaped steps 196, 198, 200, 202, 204, and 206, corresponding to PARK [P], REVERSE [R], NEUTRAL [N], DRIVE [D], LOW 1 [S], and LOW 2 [L] drive ratios, respectively, are formed on a tail-portion 207 of the cam plate 124, while a plurality of substantially right-angled steps 208, 210, 212, 214, 216, and 218, with the same respective corresponding drive ratios, are formed on a tail-portion 219 of the latch plate 126.

A first substantially L-shaped latch member 220 is pivotally mounted on a fixed pivot pin 222 secured to the plate member 30 (FIG. 4). A spring 224 is mounted around the pivot pin 222 and secured at one extended end 226 thereof to the plate member 30 in a notch 227 (FIG. 7) formed in an edge thereof, and at the other extended end 228 thereof (FIG. 6) to the latch member 220 in a notch 230 formed in an edge of a leg 232 thereof.

A flange 234 (FIGS. 4 and 6) is formed on the free end of the leg 232 of the latch member 220. The free end of the other leg 236 (FIG. 6) has a flat end-portion 238 thereof positioned adjacent a flat end-portion 240 formed on the free end of one leg 242 of a second substantially L-shaped latch or bellcrank member 244. The bellcrank member 244 is pivotally mounted on a fixed pivot pin 246 secured to a plate member 248 (FIGS. 8 and 9), the latter being formed on an edge of the flat plate member 32. A step 250 is formed on the free end of the other leg 252 of the bellcrank member 244 for at times being contacted by a pin member 254 (FIGS. 2 and 8) extending from a side of the upper gear-rack 176. An actuating pin 256 (FIGS. 2, 7, and 8) extends from the other side of the gear-rack 176, extending into an ignition switch assembly 258 (FIG. 7) mounted on the plate member 32. The leg 252 is urged in a clockwise direction by an extended end 260 of a coil spring 262 mounted around the fixed pivot pin 246, while the other extended end 264 of the spring 262 is restrained in a notch 266 formed in an edge of the plate member 248. A stop-tab 267 is formed on the plate member 248 adjacent an edge of the leg 252 opposite the edge thereof contacted by the extended spring end 260.

As shown in FIG. 5, a back-up light switch assembly 268, including a switch member 270, is secured to the plate member 30 adjacent an end-portion 272 of the leg-like member 156 formed on the latch plate 126. A key warning-buzzer switch assembly 274 is illustrated in FIGS. 7 and 9, and may be associated with the lock mechanism 20.

OPERATION

It may be noted by referring to FIG. 8 that the various operational positions for the lock mechanism 20 and its associated gear-rack-driven rod members 178 and 180, are START [S], RUN [R], OFF [O], LOCK [L], and ACCESSORIES [A], as illustrated. It may also be noted that, with the lock mechanism 20 positioned in the OFF or RUN positions, both rod members 178 and 180 are withdrawn from the various openings in the adjacent sprocket 44 and the cam plate 124. In all other positions, one or the other of the rod members 178 and 180 reciprocally enter some one of the openings 190 and 192 (FIG. 8) and the openings 191 (FIG. 5). When it is desired to actuate particular accessories, such as the radio, when the engine is off, the rod member 180 is moved, upon manual rotation of the ignition key, to the ACCESSORIES position completely through the interlock opening 192 and into the opening 194 formed in the cam plate 124, such lateral movement of the rod member 180 and the gear-rack 176 serving to accommodate the length of travel required to rotate the key and, hence, the gear 172 to the ACCESSORIES position.

It is apparent that, with the lock mechanism 20 in either the LOCK or ACCESSORIES attitude, the sprocket 44 will be locked from rotation. During START-up operation, it is essential that the control knob 15 be positioned in either PARK or NEUTRAL rotary positions in order that the rod member 178 may enter either the respective PARK opening 190 or NEUTRAL opening 191 (FIG. 5) in the sprocket 44 to lock the latter from rotation, while permitting the actuating pin 256 (FIG. 2) formed on the side of the upper gearrack 176 to be moved laterally into a position whereat it actuates the ignition switch 258.

Throughout the above-mentioned resultant movements of the rack-driven rod members 178 and 180 into the RUN, OFF, LOCK, and ACCESSORIES positions, the leg 252 of the bellcrank member 244 is urged by the coil spring 262 in a clockwise direction in FIG. 8, to abut against the stop-tab 267 formed in the plate member 248. It is only when the upper gear-rack 176 is moved leftwardly in FIG. 8 to the START position that the pin member 254 (FIG. 2) extending from the side thereof contacts the step 250 on the free end of the leg 252. The resulting pivoting movement of the bellcrank member 244 during START raises the endportion 240 of the leg 242 into contact with the endportion 238 of the leg 236 of the latch member 220. Such upward movement of the leg 236 pivots the latch member 220 about the fixed pivot pin 222 in a clockwise direction in FIG. 6, unlatching the flange 234 from the right-angled PARK step 208 of the latch plate 126 and, with the aid of the cam-like V-shaped step 196 on the cam plate 124, permitting the extended end 142 of the spring 136 to urge the latch plate 126 and the cam plate 124 toward NEUTRAL, whereupon the extended end 142 will abut against the upper side of the fixed pin 144 in FIG. 6.

Now, assume that the ignition key is rotated to the RUN position. As indicated above, this frees the rod members 178 and 180 from the sprocket 44, permitting the control knob 15 to be rotated to any selected position corresponding to the P, R, N, D, S, and L drive ratio positions shown by the indicia 24 in FIG. 1. At this point it should be noted that with the pointer 92 being secured to the ring gear 82 of the arrangement consisting of the ring gear 82, the pinion gears 80 and 78, and the sun gear 68, and the latter being connected for rotation with the sprocket 42, for each 180° rotary movement of the control knob 15, there results a 90° rotary movement of the pointer 92. Thus, the visible portion of the internal components of the control mechanism, specifically, the window 26 and the shift ratio indicia 24, are both compact and effectively readily observable.

As previously indicated, and as may be noted in FIG. 6, the slotted opening 150 formed in the cam plate 124 is slightly larger than the diameter of the extension 148 of the pin 146 secured to the latch plate 126. It is this difference in dimension which permits the initial manual rotary motion of the control knob 15 to cause the cam plate 124 to be rotated slightly ahead of any rotary motion of the latch plate 126. It is in this manner that a sloped side of a cam plate notch, such as the REVERSE V-shaped step 198, for example, serves as a cam to lift the flange 234 of the latch member 220 from its latched position on the adjacent right-angled REVERSE step 210 of the latch plate 126. This, of course, frees the control knob assembly 14 for continued manual rotation to a different drive ratio position. Once the flange 234 is latched onto the right-angled NEUTRAL step 212 of the latch plate 126 and the extended end 142 of the spring 136 is positioned against the fixed pin 144, thereafter, when the control knob 15 is manually rotated to the DRIVE position, for example, it may be realized that the other extended end 140 of the spring 136 would leave its position against the fixed pin 144 and be urged downwardly, or in a counterclockwise direction in FIG. 6, via the pin 146 and its extension 148, until the flange 234 seats itself in the right-angled DRIVE step 214 of the latch plate 126, thus setting the transmission (not shown) in its DRIVE ratio via the cable 158.

Continued rotation of the control knob 15 toward the LOW drive ratios [S or L] results in the flange 234 attaining a latched position in either the right-angled S step 216 or the right-angled L step 218 of the latch plate 126, the transmission ratio corresponding thereto via the cable 158. It may be noted that the "slack" between the pin extension 148 and the slotted opening 150 of the cam plate 124 is now on the other side of that illustrated in FIG. 6 and, correspondingly, the initial movement of the cam plate 124 in a reverse direction serves to cause the opposite sloped sides of the V-shaped steps 206, 204, or 202 of the cam plate 124 to lift the flange 234 of the latch member 220 from the respective right-angled steps 218, 216, or 214 of the latch plate 126, in order to seek a new drive ratio position, or to permit the extended end 140 of the spring 136 to urge the pin 146 and its extension 148 and, hence, the cam plate 124 and the latch plate 126 in a clockwise direction in FIG. 6 toward NEUTRAL.

The cable 160, also connected to the leg-like member 156 formed on the latch plate 126, is adapted to lock the steering wheel (not shown) whenever the control knob 15 is in the PARK position. Also, it is while the control knob 15 is in PARK that the lock mechanism 20 may be rotated to its LOCK position (FIG. 8), since the rod member 180 may extend into the interlock opening 192 in the adjacent sprocket 44, thus serving to lock up the entire control system, as explained above.

It is apparent from FIG. 5 that, as the end-portion 272 of the leg-like member 156 reaches the REVERSE position, the switch member 270 of the switch assembly 268 will be actuated to energize the back-up lights (not shown).

FIG. 10 Embodiment

Figure 10:
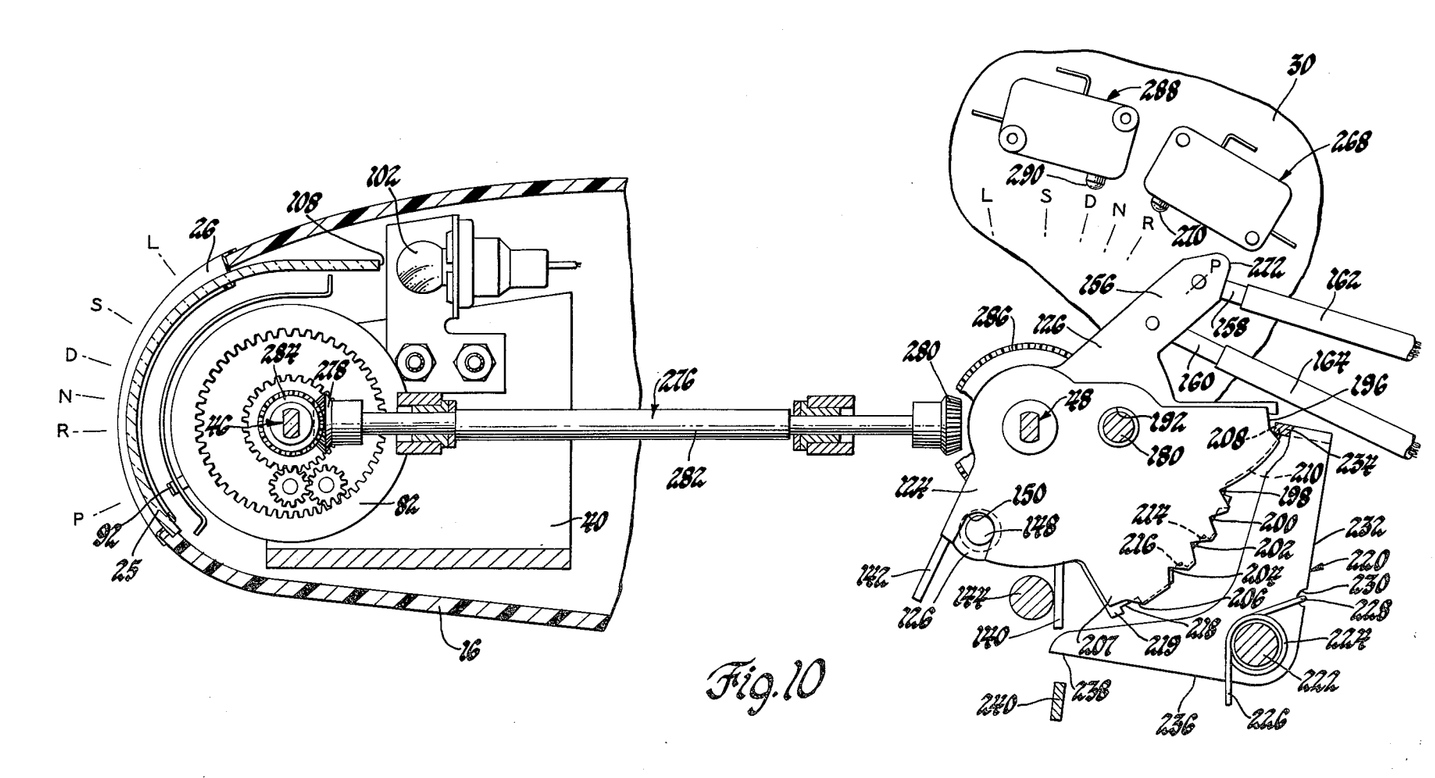
FIG. 10 is a fragmentary cross-sectional view of an alternate embodiment of the drive mechanism portion of the invention.

In FIG. 10, it may be noted that a gear-drive arrangement 276 has been substituted for the sprocket-and-chain-drive arrangement of FIGS. 4 and 6. The gear-drive arrangement 276 includes a pair of oppositely disposed bevel gears 278 and 280 mounted on the opposite ends of a connnector rod 282. The teeth of the bevel gear 278 mesh with the teeth of a gear 284 mounted on the shaft 46 in lieu of the smaller sprocket 42. The teeth of the bevel gear 280 mesh with the teeth of a gear 286 mounted on the shaft 48 in lieu of the larger sprocket 44. In all other respects, the arrangement shown in FIG. 10 operates the same as that described above relative to FIGS. 1–9, except that the drive ratio indicia P, R, N, D, S, and L are positioned in reverse-order to the indicia 24 of FIG. 1, with the operational rotation of the associated control knob being reversed to comply therewith.

A seat belt switch assembly 288 may be mounted on the plate member 30 with a switch member 290 extending therefrom for contact by the end-portion 272 of the leg-like member 156 formed on the latch plate 126 when either the latch plate 126 shown in FIG. 10 or the latch plate 126 of FIG. 5 is rotated into the DRIVE position.

It should be apparent that the invention provides an efficient instrument panel-mounted shift control arrangement, including provisions for many desirable features, such as a compact lighted dial with immediately adjacent rotary control knob, start-up in PARK or NEUTRAL only, shift system and steering wheel lockup in PARK, associated back-up light and seat belt buzzer switches, and automatic return to NEUTRAL from any forward or reverse drive range prior to engaging the START circuit.

While but two embodiments of the invention have been shown and described, other modifications thereof are possible.

We claim:

1. A control mechanism for use with a vehicular transmission, said control mechanism comprising a bracket member, first and second sprockets rotatably mounted on said bracket member, a control knob operatively connected to one of said sprockets and manually rotatable into a plurality of predetermined circumferential positions corresponding to predetermined transmission shift ratios, drive means operatively connected between said first and second sprockets, a cam plate mounted for rotation with said second sprocket, a latch plate mounted adjacent said cam plate for rotation independent of said cam plate, lost-motion means interconnecting said latch plate and said cam plate, a plurality of camming steps formed on a portion of said cam plate, a plurality of latching steps formed on an adjacent portion of said latch plate corresponding to said shift ratios, actuating means operatively connected between said latch plate and said transmission for selectively establishing said shift ratios, a latch member pivotally mounted adjacent said camming and latching steps, spring means operatively connected to said latch member for urging said latch member into contact with any adjacent latching step, the combination of initial movement of said camming steps on said cam plate and the lost motion resulting from relative movement of said cam and latch plates via said lost-motion means serving to unlatch said latch member from said adjacent latching step of said latch plate upon initial rotary movement of said control knob, with continued rotary movement of said control knob causing said latch plate to rotate until said latch member becomes selectively seated in another of said latching steps of said latch plate corresponding to a selected one of said shift ratios.

2. A control mechanism for use with a vehicular transmission, said control mechanism comprising a bracket member, first and second sprockets rotatably mounted on said bracket member, a control knob operatively connected to one of said sprockets and manually rotatable into a plurality of predetermined circumferential positions corresponding to PARK, REVERSE, NEUTRAL, DRIVE, and LOW transmission shift ratios, an endless chain mounted around said first and second sprockets, a cam plate mounted for rotation with said second sprocket, a latch plate mounted adjacent said cam plate for rotation independent of said cam plate, a notched opening formed in said cam plate, a pin secured to said latch plate and extending into said notched opening, the diameter of said pin being a predetermined amount smaller than the width of said notched opening, a plurality of V-shaped steps formed on a portion of said cam plate, a plurality of right-angled steps formed on an adjacent portion of said latch plate corresponding to said shift ratios, actuating means operatively connected between said latch plate and said transmission for selectively establishing said shift ratios, a latch member pivotally mounted adjacent said V-shaped and right-angled steps, spring means operatively connected to said latch member for urging said latch member into contact with any adjacent right-angled step, the combination of initial movement of said V-shaped steps on said cam plate and the lost motion resulting from the space between said pin and said notched opening serving to unlatch said latch member from said adjacent right-angled step of said latch plate upon initial rotary movement of said control knob, with continued rotary movement of said control knob causing said latch plate to rotate until said latch member becomes selectively seated in another of said right-angled steps of said latch plate corresponding to a selected one of said shift ratios.

3. A control mechanism for a vehicular transmission, said control mechanism comprising a bracket member, first and second sprockets rotatably mounted on said bracket member, a control knob operatively connected to one of said sprockets and manually rotatable into a plurality of predetermined circumferential positions corresponding to PARK, REVERSE, NEUTRAL, DRIVE, and LOW transmission shift ratios, an endless chain mounted around said first and second sprockets, a cam plate mounted for rotation with said second sprocket, a first opening formed in said second sprocket at a first predetermined diameter thereof, second and third spaced openings formed in said second sprocket at a second predetermined diameter thereof, a rotatable lock mechanism having a gear formed on an end thereof, said gear being rotatable through a plurality of predetermined circumferential positions including Lock and Start positions, a pair of oppositely disposed parallel gear-racks connected for meshing engagement with said gear, and a pair of rod members formed on adjacent ends of said gear-racks, one of said rod members being caused to enter said first opening in response to movement of said control knob to said PARK position and movement of said gear to said Lock position, the other of said rod members being caused to alternately enter said second and third openings in response to movement of said control knob to PARK and NEUTRAL positions, respectively, and movement of said gear of said lock mechanism to said Start position, thereby locking said second sprocket and preventing the actuation of said REVERSE, DRIVE and LOW shift ratios.

4. A control mechanism for a vehicular transmission, said control mechanism comprising a bracket member, first and second sprockets rotatably mounted on said bracket member, a control knob operatively connected to one of said sprockets and manually rotatable into a plurality of predetermined circumferential positions corresponding to PARK, REVERSE, NEUTRAL, DRIVE, and LOW transmission shift ratios, an endless chain mounted around said first and second sprockets, a sun gear mounted for rotation with said first sprocket, a ring gear mounted for independent rotation with respect to said sun gear and said first sprocket, at least one pinion gear in mesh with said sun gear and said ring gear, a pointer secured to said ring gear for rotation therewith, and a plurality of fixed shift ratio indicia mounted adjacent said pointer in a spaced relationship with the outer periphery of said ring gear, said pointer being caused to rotate through a length equal to a predetermined fraction of the length of rotation of said control knob for selective alignment with said shift ratio indicia.

5. A control mechanism comprising a bracket member, first and second externally toothed members rotatably mounted on said bracket member, a control knob operatively connected to one of said toothed members and manually rotatable into a plurality of predetermined circumferential positions, an interconnecting drive means operatively connected between said first and second toothed members for driving said second toothed member in response to rotary movement of said first toothed member via said control knob, a gear arrangement including a sun gear, at least one pinion gear, and a ring gear, said sun gear being mounted for rotation with said first toothed member, a pointer element secured to said ring gear, said gear arrangement serving to cause said pointer element to rotate through one-half the arcuate length of said control knob, a cam plate mounted for rotation with said second toothed member, a latch plate, lost-motion means interconnecting said latch plate and said cam plate, an actuating cable secured to said latch plate, first spring means for urging the rotation of said latch plate in a predetermined direction in order to move said actuating cable, a latch member pivotally mounted adjacent said latch plate, second spring means for urging said latch member into contact with said latch plate to restrain rotary movement of said latch plate, cam means formed on said cam plate for urging said latch member out of contact with said latch plate upon the initial rotary movement of said control knob, locking means having a plurality of manually-actuated operating positions and adapted to prevent the rotation of said second toothed member during the combination of selected rotary positions of said control knob and selected operating positions of said locking means, and to unlatch said latch member from said latch plate during the combination of a particular rotary position of said control knob and a particular operating position of said locking means.

6. A control mechanism for use with a vehicular transmission, said control mechanism comprising a bracket member, first and second externally toothed members rotatably mounted on said bracket member, a control knob operatively connected to one of said toothed members and manually rotatable into a plurality of predetermined circumferential positions corresponding to PARK, REVERSE, NEUTRAL, DRIVE, and LOW transmission shift ratios, a pair of interconnected bevel gears operatively connected between said first and second toothed members for driving said second toothed member in response to rotary movement of said first toothed member via said control knob, a gear arrangement including a sun gear, at least one pinion gear, and a ring gear, said sun gear being mounted for rotation with said first toothed member, a pointer element secured to said ring gear, said gear arrangement serving to cause said pointer element to rotate through one-half the arcuate length of said control knob, a cam plate mounted for rotation with said second toothed member, a latch plate mounted adjacent sad cam plate for rotation independent of said cam plate, a notched opening formed in said cam plate, a pin secured to said latch plate and extending into said notched opening, the diameter of said pin being a predetermined amount smaller than the width of said notched opening, an actuating cable secured to said latch plate and operatively connected to said transmission for selectively establishing said shift ratios, first spring means for urging the rotation of said latch plate in a predetermined direction in order to move said actuating cable, a latch member pivotally mounted adjacent said latch plate, a plurality of right-angled steps formed on said latch plate, second spring means for urging said latch member into contact with any adjacent right-angled step of said latch plate to restrain rotary movement of said latch plate by said first spring means from selected shift ratio positions, a plurality of V-shaped steps formed on said cam plate for urging said latch member out of contact with said latch plate upon the initial rotary movement of said control knob, a rotatable lock mechanism having a gear and gear-rack means associated therewith, said gear-rack means being movable through a plurality of manually actuated operating positions including a START position and adapted to cooperate with openings formed in said second toothed member to prevent the rotation of said second toothed member during the combination of either PARK or NEUTRAL positions of said control knob and selected operating positions of said lock mechanism, and to unlatch said latch member from said latch plate during the combination of the PARK position of said control knob and said START position of said lock mechanism.

7. A control mechanism for use with a vehicular transmission, said control mechanism comprising a bracket member, first and second externally toothed members rotatably mounted on said bracket member, a control knob operatively connected to one of said toothed members and manually rotatable into a plurality of predetermined circumferential positions corresponding to PARK, REVERSE, NEUTRAL, DRIVE, and LOW transmission shift ratios, an endless chain mounted around said first and second toothed members for driving said second toothed member in response to rotary movement of said first toothed member via said control knob, a gear arrangement including a sun gear, at least one pinion gear, and a ring gear, said sun gear being mounted for rotation with said first toothed member, a pointer element secured to said ring gear, said gear arrangement serving to cause said pointer element to rotate through one-half the arcuate length of said control knob, a cam plate mounted for rotation with said second toothed member, a latch plate mounted adjacent said cam plate for rotation independent of said cam plate, a notched opening formed in said cam plate, a pin secured to said latch plate and extending into said notched opening, the diameter of said pin being a predetermined amount smaller than the width of said notched opening, an actuating cable secured to said latch plate and operatively connected to said transmission for selectively establishing said shift ratios, first spring means for urging the rotation of said latch plate in a predetermined direction in order to move said actuating cable, a latch member pivotally mounted adjacent said latch plate, a plurality of right-angled steps formed on said latch plate, second spring means for urging said latch member into contact with any adjacent right-angled step of said latch plate to restain rotary movement of said latch plate by said first spring means from selected shift ratio positions, a plurality of V-shaped steps formed on said cam plate for urging said latch member out of contact with said latch plate upon the initial rotary movement of said control knob, a rotatable lock mechanism having a gear and gear-rack means associated therewith, said gear-rack means being movable through a plurality of manually actuated operating positions including a START position and adapted to cooperate with openings formed in said second toothed member to prevent the rotation of said second toothed member during the combination of either PARK or NEUTRAL positions of said control knob and selected operating positions of said lock mechanism, and to unlatch said latch member from said latch plate during the combination of the PARK position of said control knob and said START position of said lock mechanism.

* * * * *

UNITED STATES PATENT OFFICE
CERTIFICATE OF CORRECTION

PATENT NO. : 3,901,097
DATED : August 26, 1975
INVENTOR(S) : Richard D. Williams and Fred G. Michaels It is certified that error appears in the above-identified patent and that said Letters Patent are hereby corrected as shown below:

Column 2, line 47 "15" should read -- 25 --.

Column 5, line 56 "openings" should read -- opening --.

Column 11, line 2 "sad" should read -- said --.

Column 12, line 26 "stain" should read -- strain --.

Signed and Sealed this twenty-seventh Day of April 1976

[SEAL]

Attest:

RUTH C. MASON
Attesting Officer

C. MARSHALL DANN
Commissioner of Patents and Trademarks